Figure 1:
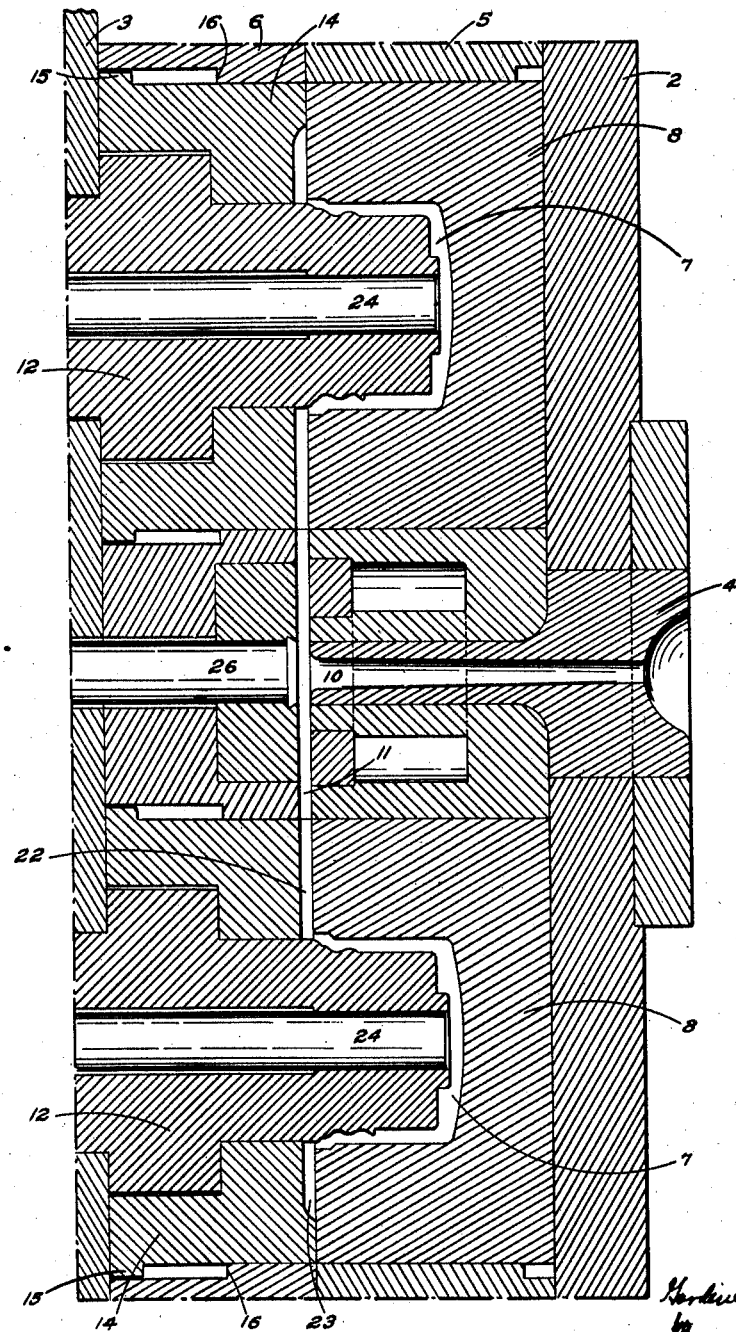

Jan. 18, 1944.  G. C. WILSON  2,339,443
INJECTION MOLDING MACHINE
Filed March 8, 1941  2 Sheets-Sheet 1

Jan. 18, 1944.  G. C. WILSON  2,339,443
INJECTION MOLDING MACHINE
Filed March 8, 1941  2 Sheets-Sheet 2
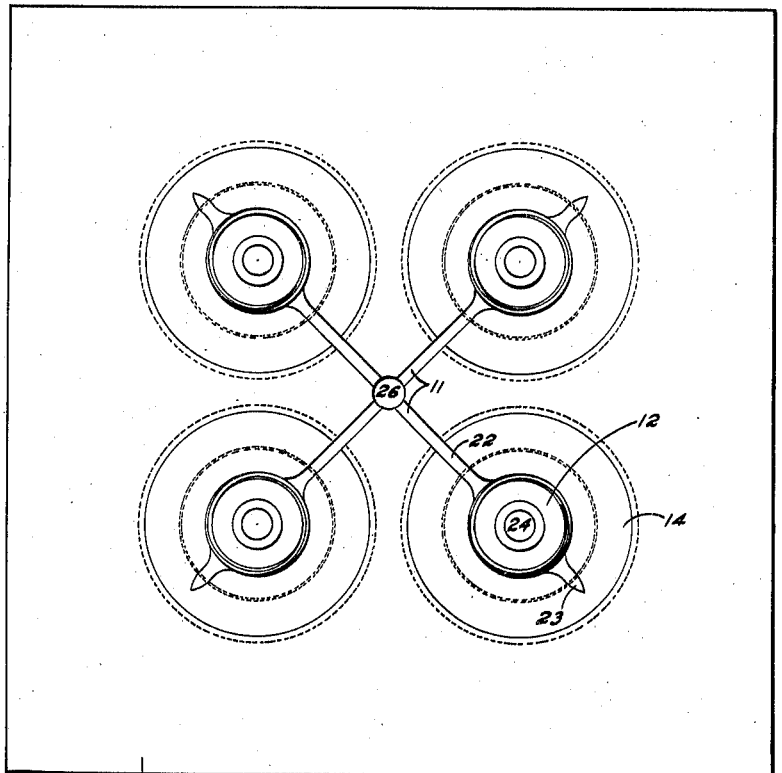
Fig. 3
Fig. 2
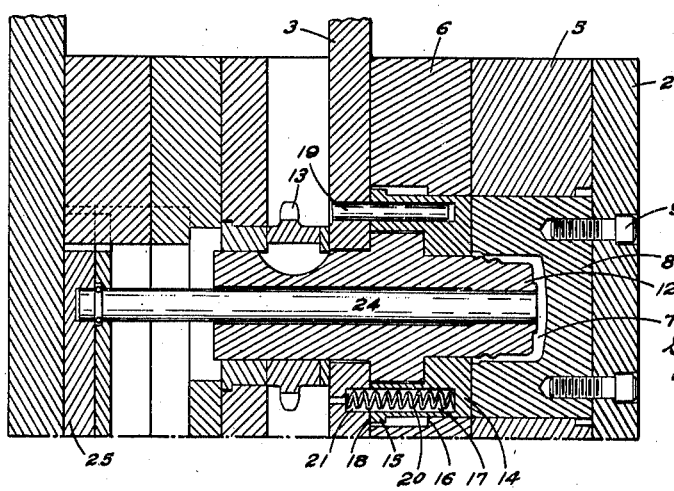
Inventor
Gardiner C Wilson
by
Walter F Kaufman
Attorney Patented Jan. 18, 1944

2,339,443

UNITED STATES PATENT OFFICE 2,339,443

INJECTION MOLDING MACHINE

Gardiner C. Wilson, Lancaster, Pa., assignor to Armstrong Cork Company, Lancaster, Pa., a corporation of Pennsylvania Application March 8, 1941, Serial No. 382,380

14 Claims. (Cl. 18—34)

This invention relates to injection molding machines for forming from thermoplastic composition a plurality of internally threaded articles connected to one another and, more particularly, to an injection molding machine for forming a plurality of internally threaded closures connected to one another having means for ejecting the molded article as an integral unit.

A standard form of injection molding machine for molding a thermoplastic material, such as polystyrene or cellulose acetate, for example, includes a pair of opposed mold-backing platens and an injector all mounted upon a base frame. Companion molding plates are carried respectively by said platens. One of such plates includes a plurality of mold cavities and is a resistance member usually held in a fixed position while the other carries a plurality of members adapted to form the inner surface of the articles to be molded and is a pressure transmitting member, reciprocable toward and from the resistance plate to close and open the sectional mold. The injector usually projects through a central aperture in the resistance platen and has a nozzle for injection into a single charging port or sprue in the mold plate carried by the platen. The companion mold plates are formed at their parting surfaces to define runner channels leading from the sprue to the different cavities to distribute to the latter the charge injected through the sprue. In forming the molded article, the mold is closed and the threaded members rotated by means of lead screws to advance them into the mold cavities. The charge of thermoplastic composition is then injected into the charging port or sprue and is distributed through the runner channels to the various mold cavities. The threaded members are then retracted by rotation in the opposite direction to remove them from the cavities and the mold is opened.

Such device is extremely complicated, entails precise adjustment of working parts and requires careful synchronization of the driving means in its opposite direction rotations with the ejection of the molded part. In addition, frequently, the molded composition in the channels becomes disengaged and breaks, entailing difficulties in removal of the broken article as well as consequent loss contingent upon the fact that such articles are not saleable. Due to the precise and accurate synchronization required, a large portion of working time is consumed in making necessary adjustments so as to permit operation. Since such careful and precise adjustments are required in the operation of the complicated device, it will be appreciated a large amount of down-time is entailed by the frequent necessity of making repairs during operation of the device.

The chief object of my invention is to provide an injection molding machine so constructed as to eliminate the defects and disadvantages discussed above. An object of my invention is to provide an injection molding machine for forming a plurality of internally threaded articles connected to one another, in which means are provided to eject such articles as an integral unit. A further object of my invention is to provide article ejecting means for injection molding machines which is simple in design, automatic in operation and economical in original cost and repairs. A still further object is to provide rings surrounding each of the thread forming members which are adapted to "back-off" simultaneously the connected molded threaded articles from the threaded members, and thus eliminate substantial breakage. A still further object is to provide means in such rings to prevent rotation of the molded articles during rotation of the threaded members. A still further object is to provide means to detach the molded articles from the rings.

This invention relates to an injection molding machine for forming a plurality of internally threaded articles comprising in combination, a mold plate having a plurality of mold cavities, injecting means extending through said plate, a second mold plate from which extend a plurality of rotatable threaded members adapted to form the inner surface of the articles to be molded, at least one of said plates having channels therein connecting the injecting means and the mold cavities when the mold is closed, and means surrounding said members adapted to engage the molded article, said means being held under compression when the mold is closed and being adapted upon opening of the mold and rotation of said members to urge the molded article outwardly to release it from said members as an integral unit.

The attached drawings illustrate a preferred embodiment of my invention, in which Figure 1 is a sectional view of an injection molding machine illustrating the mold in closed position;

Figure 2 is a sectional view of a threaded member disposed in a mold cavity and serving to illustrate the construction and the operation of the ring member; and Figure 3 is a plan view of the pressure transmitting mold plate.

Referring to the drawings, there is shown a standard form of injection molding machine which includes a pair of opposed mold-backing platens 2 and 3 and an injector 4 all suitably mounted upon a base frame (not shown). Molding plates 5 and 6 are carried respectively by the platens 2 and 3. Plate 5 contains a plurality of mold cavities 7 adapted to form the exterior contour of the article to be molded. Preferably, for ease in making various sizes of articles, such cavities 7 are formed in small plates 8 disposed in openings in the plate 5 and secured to the platen 2 by machine screws 9. Preferably, mold plate 5 is a resistance plate usually held in a fixed position while mold plate 6 is a pressure plate reciprocable toward and from the mold plate 5 to close and open the mold. The injector 4 projects through a central opening in the plate 2 and is adapted to inject thermoplastic composition into a single sprue or charging port 10 disposed in the mold plate 5. The companion mold plates are formed at their parting surfaces to define runner channels 11 leading from the port 10 to the various mold cavities 7 to distribute to the latter the thermoplastic composition injected through the port 10. Such channels 11 may be formed in the surface of either mold plate 5 or mold plate 6 or, if desired, portions of the channels may be formed in both surfaces.

Threaded members or so-called force plugs 12, as illustrated in Figure 3 four in number, extend through the plate 6 and beyond its parting surface and are adapted to extend into the cavities 7 to form the inner surface of the articles to be molded when the plate 6 is reciprocated forward to engage plate 5. For ease in description, I will describe the one member only since the members are similar in design and actuated in the same manner. The member 12 is held in predetermined position and is rotatable about its axis but is not movable to any substantial extent in a direction along its axis. A pinion gear 13 is disposed about and connected to the lower portion of the member 12 and is adapted to be engaged by a second gear (not shown) driven by any suitable actuating means to rotate the member 12. The opening in the plate 6 through which the member 12 extends is larger than such member for a purpose hereinafter described.

Ring members 14 are disposed about each of the threaded members 12 in the openings in the plate 6 and when the mold is open protrude from the parting surface of such plate as illustrated in Figure 3. Each ring 14 is provided with a flange 15 adapted to engage a shoulder 16 disposed about the mold opening when the mold is in open position thus retaining the ring 14 in the opening. A plurality of recesses 17 are provided in the internal surface 18 of the ring 14, preferably six in number. In alternate recesses 17 are disposed pins 19 which extend through and are secured to the platen 3 so as to assure accurate reciprocation of the ring. In the remaining recesses 17 are disposed helical springs 20 which are seated in recesses 21 in the platen 3. It will be understood, if desired, only one spring 20 accurately disposed need be used and in such case the recess 17 in the ring 14 is changed accordingly. In the external surface of the ring 14 is provided a channel 22 flared outwardly at its inner end as shown in Figure 3, which is adapted to be disposed in substantial alignment with a channel 11 in the mold surface when the mold is closed and which in effect forms a continuation of such channel 11 so as to connect the charging port 10 and the mold cavity 7. Preferably, on the opposite side of the ring 14 from the channel 22 is provided a second channel 23 for a purpose hereinafter discussed. It will be appreciated the opening in the mold plate 6 in which is disposed the ring 14 need be sufficiently large to permit limited reciprocation of the ring and the means which are used to secure the ring in position, that is, the pins 19, the engaging flange 15 and shoulder 16 must likewise be designed to permit such limited reciprocation. All of the rings 14 are constructed and disposed in the same manner.

Preferably, similar plungers 24 are provided extending centrally of each member 12 and are connected to a plunger plate 25. The plungers 24 are reciprocable horizontally, as shown in Figures 1 and 2. A central plunger 26 is likewise provided centrally of the plate 6 and, when the mold is closed, is disposed opposite the charging port or sprue 10.

When the mold is in open position the mold plates 5 and 6 are not contiguous and the members 12 and rings 14 protrude from the surface of the plate 6. As the mold is closed by advancing the plate 6 toward the plate 5, the rings 14 first engage the surface of the plate 5 and are reciprocated rearwardly thus compressing the springs 20 as the plate 6 continues its advance. The threaded members 12 are disposed in the mold cavities 7 as the mold closes with the surfaces of the plates 5 and 6 in engagement. The channels 22 in the rings 14 are disposed in substantial alignment with the channels 11 so that the charging port 10 and the various mold cavities are connected.

The injector 4 then injects thermoplastic composition into the charging port 10 which distributes it through the channels 11 and 22 to the mold cavities 7 to fill the cavities. After the composition has set, there is formed a molded article consisting of, for example, four internally threaded articles such as closures connected as an integral unit by bars formed from the composition in the channels 11 and 22 and the port 10.

In removing such molded article from the mold, the plate 6 is reciprocated in the opposite direction and substantially simultaneously with the start of such movement the members 12 are rotated. As the plate 6 travels rearwardly, attempted expansion of the springs 20 urges the rings outwardly thus urging the molded article outwardly and, in effect, "backing off" the threaded articles from the members 12. The plungers 24 and 26 are actuated by any suitable means during the reciprocation of the plate 6 to move forwardly, that is, in the opposite direction to the direction of travel of the plate 6, and serve to release or eject the molded article from the channels 11 and 22 and to release it from the rings 14. The molded integral article is removed from the device and the bars connecting the threaded articles severed by any suitable means so as to present separate unconnected threaded closures.

I have stated above it is desirable to provide channels 23 in the rings 14 disposed on the opposite side of each ring from the channel 22. Such channels 23 provide spurs on the edges of the molded threaded articles which lie within the recess in the ring 14 and assist in preventing rotation of such articles during rotation of the threaded members 12 and thus serve to obviate breakage during removal of the articles from the members 12. This feature is of value when molding large size closures such as 38 mm. in size or larger although such large closures may be generally molded quite satisfactorily when the inner end of the channel 22 is flared as shown in Figure 3. Such spurs, of course, may be severed from the article at the same time as the connecting bars.

I have found it generally desirable that the plates 5 and 6 be a slight distance apart, say $\frac{1}{32}$ of an inch for example, before the members 12 are rotated. If desired, a suitable switch (not shown) may be disposed adjacent the engaged mold surfaces which serves to operate the actuating means for rotation of the members 12 after the mold plate 6 has moved such slight distance from the plate 5. The speed of rotation of the members 12, preferably, is not greater than the speed of opening of the press to assure withdrawal of the molded articles from the mold cavities. It will be appreciated rotation of the members 12 occurs substantially simultaneously with the start of the reciprocation movement of the plate 6 since such distance is relatively minute and the lag or delay in sequence of the operations is minute.

It will be observed my invention provides a simple, ready mechanism for the removal of threaded articles from the mold. The mechanism is automatic and simple in construction and does not create excessive down-time during the operation of the molding machine. My mechanism is effective to efficiently remove a plurality of internally threaded closures as an integral unit. Breakage and cracking of such articles during the removal operation is substantially obviated.

While I have described and illustrated a preferred embodiment of my invention, it will be understood my invention is not so limited since it may be otherwise embodied within the scope of the following claims.

I claim:

1. In an injection molding machine for forming a plurality of internally threaded articles connected to one another, the combination of a mold plate having a plurality of mold cavities, injecting means extending through said plate, a second mold plate, a plurality of rotatable threaded members extending from said second mold plate adapted to form the inner surface of the articles to be molded, at least one of said plates having channels therein connecting the injecting means and the mold cavities when the mold is closed, and yieldable means surrounding said members adapted to engage the molded article, said means being held under compression when the mold is closed and being adapted upon opening of the mold and rotation of said members to urge the molded article outwardly to release it from said members as an integral unit.

2. In an injection molding machine for forming a plurality of internally threaded articles connected to one another, the combination of a mold plate having a plurality of mold cavities, injecting means extending through said plate, a second mold plate, a plurality of rotatable threaded members extending from said second mold plate adapted to form the inner surface of the articles to be molded, at least one of said plates having channels therein connecting the injecting means and the mold cavities when the mold is closed, and a yieldable article engaging member disposed adjacent each of said threaded members, said article engaging members being held under compression when the mold is closed and being adapted upon opening of the mold and rotation of said threaded members to urge the molded article outwardly to release it from said threaded members as an integral unit.

3. An injection molding machine according to claim 2 in which each of said article engaging members comprises a ring surrounding a threaded member, having a channel in its exterior surface adapted to be disposed in substantial alignment with the plate channel when the mold is closed.

4. In an injection molding machine for forming a plurality of internally threaded articles connected to one another, the combination of a mold plate having a plurality of mold cavities, means for injecting plastic composition in the mold cavities, a second mold plate, a plurality of rotatable threaded members extending from said second mold plate adapted to form the inner surfaces of the articles to be molded, at least one of said plates having channels therein connecting the injecting means to the mold cavities when the mold is closed, article engaging means yieldably mounted in said second mold plate adjacent said threaded members, said article engaging members being held under compression by the first mentioned mold plate when the mold is closed and being adapted upon opening of the mold and rotation of said threaded members to urge the molded article outwardly to release it from said threaded members as an integral unit, and means to release the molded article from the article engaging members.

5. In an injection molding machine for forming a plurality of internally threaded articles connected to one another, the combination of a mold plate having a plurality of mold cavities, injecting means extending through said plate, a platen, a second mold plate carried by said platen, a plurality of rotatable threaded members extending from said second mold plate, said members being adapted to form the inner surface of the articles to be molded, at least one of said mold plates having channels therein connecting the injection means and the mold cavities when the mold is closed, a plurality of rings surrounding the threaded members, said rings having recesses therein adapted to receive springs, and springs disposed in said recesses and held between the platen and the rings, said springs being held under compression by inward movement of the rings when the mold is closed, said rings being adapted to be forced outwardly by said springs upon opening of the mold and rotation of the threaded members thus urging the molded article outwardly to release it from the threaded members as an integral unit.

6. An injection molding machine according to claim 5, in which each of the rings has a channel in its exterior surface adapted to be disposed in substantial alignment with the plate channel when the mold is closed, and in which a second channel is provided in the exterior of the surface of the ring adapted to join the mold cavity when the mold is closed.

7. In an injection molding machine for forming a plurality of internally threaded articles connected to one another, the combination of a mold plate having a plurality of mold cavities, injecting means extending through said plate, a platen, a second mold plate carried by said platen, a plurality of rotatable threaded members extending from said second mold plate, said members being adapted to form the inner surface of the articles to be molded, at least one of said mold plates having channels therein connecting the injecting means and the mold cavities when the mold is closed, rings surrounding the threaded members, each of said rings having recesses therein extending from its interior surface, springs disposed in at least some of said recesses and held between the ring and said platen, and means securing each ring in predetermined position while permitting limited inward and outward movement of the ring, said springs being held under compression by inward movement of the ring when the mold is closed, said rings being adapted to be forced outwardly by said springs upon opening of the mold and rotation of the threaded members thus urging the molded article outwardly to release it from the threaded members as an integral unit.

8. An injection molding machine according to claim 7 in which means are provided to release the molded article from the rings.

9. An injection molding machine according to claim 7, in which said ring securing means comprise a plurality of pins connecting the rings to the platen, and a ledge in the mold plate adapted to engage a shoulder on the ring to prevent further outward movement thereof.

10. In a molding machine for forming an internally threaded article from thermoplastic composition, the combination of a mold plate having a mold cavity, a second mold plate, a rotatable threaded member extending from said second mold plate adapted to form the inner surface of the article to be molded, and yieldable means disposed adjacent said member adapted to engage the molded article, said means being held under compression by said mold plate when the mold is closed and being adapted upon opening of the mold and rotation of said member to urge the molded article outwardly to release it from said member.

11. A molding machine according to claim 10 in which said article engaging means comprises a ring surrounding said member.

12. In a molding machine for forming an internally threaded article from thermoplastic composition, the combination of a mold plate having a mold cavity, a platen, a second mold plate secured to said platen, a rotatable threaded member extending from said second mold plate adapted to form the inner surface of the article to be molded, a ring surrounding said threaded member, and a spring disposed between said ring and the platen, said ring being movable inwardly upon closing of the mold to place the spring under compression and being adapted to be moved outwardly by expansion of said spring upon opening of the mold and rotation of said member thus urging the molded article outwardly to release it from said member.

13. A molding machine according to claim 12 in which means are provided to release the molded article from the ring.

14. In an injection molding machine for forming a plurality of internally threaded articles connected to one another, the combination of a mold plate having a plurality of mold cavities, injecting means extending through said plate, a second mold plate, a plurality of rotatable threaded members extending from said second mold plate adapted to form the inner surfaces of the articles to be folded, at least one of said plates having channels therein connecting the injecting means and the mold cavities when the mold is closed, and yieldable means surrounding said members adapted to engage the molded article, said means being forced rearwardly by the mold plate when the mold is closed and being adapted upon opening of the mold and rotation of said members to move outwardly thus urging the molded article outwardly to release it from said members as an integral unit.

GARDINER C. WILSON.

CERTIFICATE OF CORRECTION.

Patent No. 2,339,443.  January 18, 1944.

GARDINER C. WILSON.

It is hereby certified that error appears in the printed specification of the above numbered patent requiring correction as follows: Page 3, second column, line 23, claim 4, for "means" read --members--; page 4, second column, line 30, claim 14, for "folded" read --molded--; and that the said Letters Patent should be read with this correction therein that the same may conform to the record of the case in the Patent Office.

Signed and sealed this 14th day of March, A. D. 1944.

Leslie Frazer (Seal)  Acting Commissioner of Patents.